United States Patent [19]
Kashiwagi et al.

[11] Patent Number: 5,921,725
[45] Date of Patent: Jul. 13, 1999

[54] SINTERED SILICON NITRIDE ARTICLES FOR TOOLS AND METHOD OF PREPARATION

[76] Inventors: Tetsuya Kashiwagi; Masaru Matsubara, both of c/o NGK Spark Plug Co., Ltd. 4-3-17, Ohsu, Naka-ku, Nagoya, (460), Japan

[21] Appl. No.: 08/816,143

[22] Filed: Mar. 12, 1997

[30] Foreign Application Priority Data

Mar. 13, 1996 [JP] Japan ..................................... 8-085681

[51] Int. Cl.$^6$ .................................................. B23B 27/14
[52] U.S. Cl. ........................ 407/119; 407/118; 407/120; 408/144
[58] Field of Search .................... 407/119, 118, 407/120; 408/144, 145

[56] References Cited

U.S. PATENT DOCUMENTS

| | | | |
|---|---|---|---|
| 4,578,087 | 3/1986 | Tanaka et al. | 407/119 X |
| 4,640,693 | 2/1987 | Bhat et al. | 51/295 |
| 4,919,689 | 4/1990 | Pyzik et al. | 51/309 |
| 5,370,716 | 12/1994 | Mehrotra et al. | 51/293 |
| 5,382,273 | 1/1995 | Mehrotra et al. | 51/307 |
| 5,525,134 | 6/1996 | Mehrotra et al. | 51/307 |
| 5,597,272 | 1/1997 | Moriguchi et al. | 407/119 |
| 5,702,808 | 12/1997 | Ljungberg | 407/119 X |
| 5,712,030 | 1/1998 | Goto et al. | 407/119 X |

*Primary Examiner*—Andrea L. Pitts
*Assistant Examiner*—Henry W. H. Tsai
*Attorney, Agent, or Firm*—Dougherty & Troxell

[57] ABSTRACT

Sintered silicon nitride articles for cutting tools and the like, having a high relative density, excellent wear resistance and nicking, particularly at high temperatures, and a method for preparing such articles are disclosed. The articles are made by mixing 0.25 to 3.0 vol % of magnesium oxide powder and 0.3 to 2.0 vol % of ytterbium oxide with silicon nitride starting materials, then crushing and mixing, optionally with 1.0%-vol. or less, preferably 0.5%-vol. or more of aluminum oxide powder and adding an organic binder. The article is formed using a metal press to a shape for usage as SNGN120408 tools. The sintered silicon nitride articles for tools are obtained by degasing the shaped articles, subjecting them to a primary firing at 1700 to 1900° C. and 0.3 to 1.0 MPa temperature and pressure, and following with a secondary firing at a temperature which is substantially lower than the primary firing temperature, at a pressure of 100 MPa or greater.

11 Claims, 2 Drawing Sheets

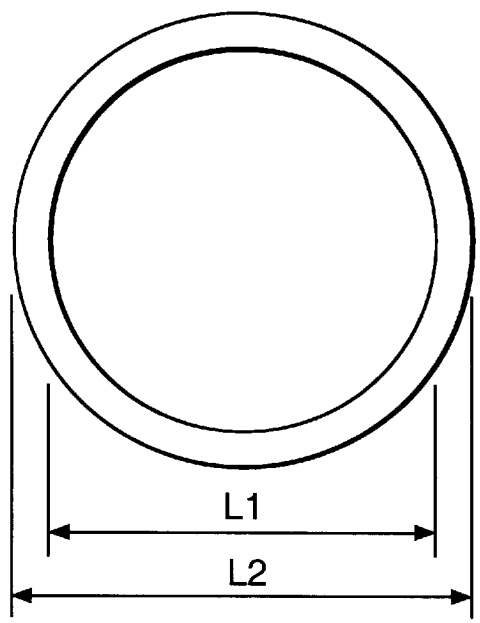
FIG. 1A   FIG. 1B
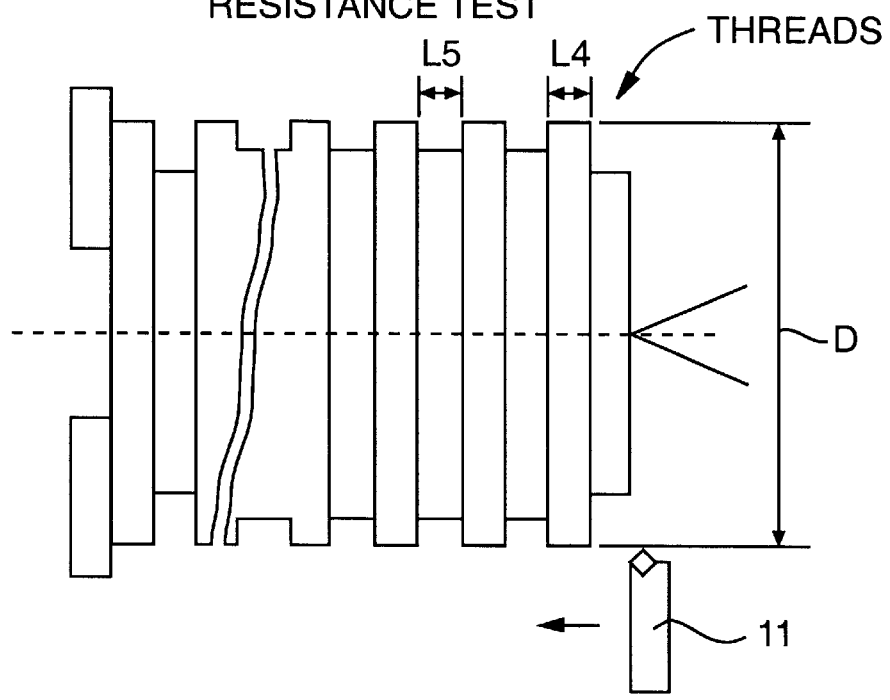
FIG. 2

SINTERED SILICON NITRIDE ARTICLES FOR TOOLS AND METHOD OF PREPARATION

FIELD OF THE INVENTION

The present invention relates to sintered silicon nitride articles for machine tools which are particularly well suited for use as cutting tools, and to a method for making such articles and more particularly to sintered silicon nitride articles which exhibit excellent resistance to wear, particularly at high temperatures.

BACKGROUND FOR THE INVENTION

Sintered silicon nitride articles, due to their inherent resistance to heat, heat shock, and wear, have found applications as constituent materials in a variety of high temperature equipment and as cutting tools. However, the high heat resistance of silicon nitride also makes it difficult to sinter. It is generally fired or sintered using sintering aids. Such sintering aids have a softening point that is lower than the decomposition temperature of the silicon nitride, and, during firing, they exist in the glass phase at the grain boundaries. When such sintered articles are used at high temperatures, the grain boundaries soften to a glass phase, entailing a decline in their properties such as wear resistance.

In order to resolve the foregoing problems, proposals have been made to use sintering aids or adjuncts that have a high softening point (see Japan Patent Application "Kokai" Disclosures Hei 4-209763, Hei 4-240162, and U.S. Pat. No. 5,382,273). Other disclosures also suggest that reducing the total amount of the sintering aids is effective in reducing the glass phase grain boundaries. However, in general, when high melting-point sintering aids are employed, the sintering properties are inferior to those obtained by using low melting-point sintering aids. As a result, in order to obtain high density sintered articles using high melting-point sintering aids, large amounts of such sintering aids must be incorporated, even at some sacrifice to the high temperature properties of the resulting articles.

Oxides of rare earth elements are well known as sintering adjuncts that form glass-phase grain boundaries with high softening points when sintering silicon nitride materials, Since the chemical properties of the rare earth elements are similar to each other, in most cases they are accorded similar treatment as a group. However, when considering them as sintering aids for silicon nitride, their sintering properties are different from each other, and the properties of the resulting sintered articles are not necessarily the same.

BRIEF SUMMARY OF THE INVENTION

In essence, the present invention contemplates sintered silicon nitride articles or tools which are finely structured and have excellent high temperature properties, including wear resistance at high temperatures. Such articles incorporate high melting-point sintering aids, but in smaller amounts than previously used. For example, the combined use, in relatively small amounts, of magnesium oxide and ytterbium oxide as sintering aids or adjuncts produce sintered articles that are tightly packed i.e., have relatively high density, and which exhibit excellent wear resistance, etc.

BRIEF DESCRIPTION OF THE DRAWINGS

FIG. 1A is a cross sectional view of a ring shaped metallic workpiece as used in cutting tests on the cutting tools in accordance with the invention;

FIG. 1B is a top or plan view of the ring shaped metallic workpiece shown in FIG. 1A;

FIG. 2 is a side elevational view of a cylindrical workpiece having threads cut therein and a ceramic cutting tool as used in fracture resistance testing;

DETAILED DESCRIPTION OF THE PREFERRED EMBODIMENTS OF THE INVENTION

Figure 3:
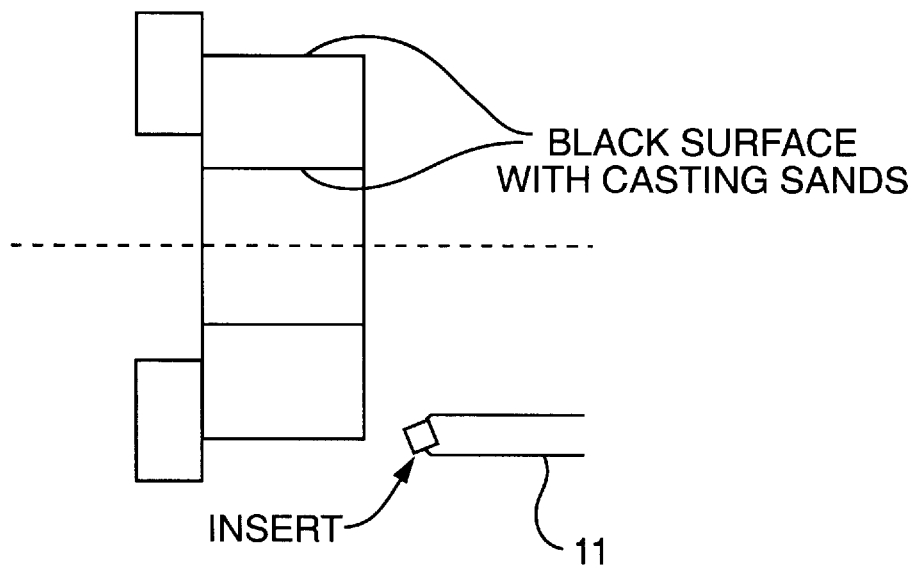
FIG. 3 is a side elevational view of a cylindrical workpiece and cutting tool insert and holder as used in wear resistance testing.

The sintered silicon nitride articles according to a first embodiment of the present invention are made from a powdered silicon nitride composition which is sintered to form sintered silicon nitride articles. The powdered silicon nitride composition contains silicon nitride powder as a raw material, magnesium oxide powder, and ytterbium oxide powder and are characterized by incorporating 0.25 to 3.0%-vol. of the foregoing magnesium oxide and 0.3 to 2.0%-vol. of the foregoing ytterbium oxide per 100%-vol. of the total powder composition, and moreover, wherein the total amount of the magnesium oxide powder plus the ytterbium oxide powder comprises 4.0%/vol. or less, and wherein the relative density of the silicon nitride article after sintering is 99% or greater and the porosity thereof is less than 0.06%/vol.

"Silicon nitride powder" refers to a raw material, that is a conventional material that may contain 1 to 2% oxygen as an impurity, with few other impurities. Further, it contains a high percentage of α-crystal content of 95% or greater. In general, commercially available raw material powders that are generally appropriate for such applications as cutting inserts may be used.

The magnesium oxide itself has a relatively high melting point. However, the presence of other sintering aids, and the inclusion of oxygen (normally in the form of silicon oxide) in the silicon nitride starting materials entails glass-phase grain boundaries (i.e. intergranular phase) with a low softening point. As a result, when large amounts of magnesium oxide are included, the high temperature properties of the resulting sintered articles decline, and their wear characteristics are not suitable for cutting inserts used at high speed cutting where a cutting edge of the insert is subject to extremely high temperatures. On the other hand, since the addition of the magnesium oxide creates a glassy intergranular phase during the sintering, better sintering properties such as high density can be obtained. This makes it possible to decrease the total amount of the other sintering aids that are used, and because of the overall small amounts, it is possible to reduce the degree to which the high temperature properties of the articles are affected.

The "0.25 to 3%-vol." range for the inclusion of the magnesium oxide is important. It is important because if less than 0.25%-vol. is included, then the sintered articles will not have an adequately fine micro structure, i.e. tight packing (high density). Further, if the 3%/vol. is exceeded, then there will be a softening of the glass-phase grain boundaries at high temperatures, diminishing thereby the hardness of the resulting sintered articles and degrading their wear resistance. The preferred composition range for this magnesium oxide is, as specified by the second embodiment of the invention, "0.25 to 1.5%-vol.," with a range of 0.25 to 1.0%-vol. being especially desirable. In this composition range, the sintering properties and the wear resistance at high temperatures are improved over those obtained at higher concentrations thereof.

Further, an inclusion of ytterbium oxide is highly effective, even when compared with the rare earth element oxides, in improving the sintering properties of silicon nitride ceramic for cutting inserts in high speed cutting. The cutting performance of inserts of the ceramic are especially improved when ytterbium oxide is used in combination with magnesium oxide. Accordingly, it is very well suited for the cutting tool applications to use such combination, wherein the objective is to decrease the total amount of sintering aids, hence the small amount of glass-phase grain boundaries, thereby to enhance the wear resistance of the cutting insert. Also, when used in materials for cutting tools, both wear resistance and resistance to nicking are required and the use of ytterbium oxide is well suited from this perspective as well.

In combinations of magnesium oxide with oxides of rare earth elements for use as sintering aids, the type of rare earth element changes the wear resistance of cutting tools made from sintered silicon nitride. For example, if yttrium oxide or dysprosium oxide is used, then the resulting cutting tool will have a comparatively high resistance to nicking but low wear resistance. When ytterbium oxide is used, the cutting tool will have slightly lower resistance to chipping than if yttrium oxide or dysprosium oxide is used, but wear resistance increases considerably. Accordingly, in order to meet an objective of this invention, which is to provide sintered silicon nitride articles for tools that will provide excellent wear resistance, especially at high temperatures (high speed cutting), it is preferable to use ytterbium oxide.

The 0.3 to 2.0%-vol. as the composition range for ytterbium oxide powder is important. If less than 0.3%-vol. is included, the strength of the sintered article declines to the point where properties such as nicking resistance (fracture resistance) becomes inadequate. If 2.0%-vol. is exceeded, the wear resistance of the sintered articles will decline, particularly at high temperatures. According to a second embodiment of the invention, the composition range of 0.3 to 1.2%-vol. for the ytterbium oxide powder is preferred. In this composition range, sintering properties are improved, and any decline in wear resistance at high temperatures is inhibited.

Furthermore, the total amount of the magnesium oxide powder and the ytterbium oxide powder should be limited to 4.0%-vol. or less. For example, if the total exceeds 4.0%-vol., the sintering properties will be improved, but hardness, strength, and wear resistance, particularly at high temperatures, will decline. If the total, as indicated by the second embodiment of the invention, is 2.5%-vol. or less, preferably 2.0%-vol. or less, sintering properties will be more than satisfactory and moreover, it is possible to inhibit a decline in hardness and strength of the sintered silicon nitride ceramic under high temperature circumstances.

In order to obtain cutting tools, etc., with excellent wear resistance, the porosity of the sintered silicon nitride articles should be low. In other words, it is very important that they are finely structured. Therefore, the total amount of sintering aids used in the present invention is held to a very low level, in order to improve sintering properties and lower porosity. It is also important to use high sintering temperatures. However, because α-type silicon nitride is used as the starting material, merely increasing the sintering temperature causes the small quantities of β-type silicon nitride present in the raw material to form nuclei which cause abnormal crystal particle growth. Such particles which have grown abnormally may develop micro-cracks within them, and the abnormally grown particles themselves may collapse; either factor can cause decreased strength in the final sintered articles.

As specified for a third embodiment of the invention, it is preferable that the sintered silicon nitride articles or tools of this invention comprises 90%-vol. or more of $\beta\text{-Si}_3\text{N}_4$ particles, most preferably more than 94%-vol., wherein 10%-vol. or less of the beta silicon nitride particles have a short axis particle diameter exceeding 1 μm, and moreover, 4%-vol. or less of the particles have a long axis diameter exceeding 10 μm.

If the sintered articles contain less than 90%-vol. of the $\beta\text{-Si}_3\text{N}_4$, then the proportion of $\alpha\text{-Si}_3\text{N}_4$ increases. In this case, there is only a little grain boundary phase, thereby causing the articles to have a structure that is too hard and brittle. Further, if there is greater than 10%-vol. of particles with short axis diameters exceeding 1 Am, or more than 4%-vol. of particles with long axis diameters exceeding 10 μm, then, it means that during a cooling stage after sintering, there will be more growth of $\beta\text{-Si}_3\text{N}_4$ that has micro-cracks within the particles, and this is undesirable. Also, if the number of $\beta\text{-Si}_3\text{N}_4$ particles having the short axis diameter exceeding 1 μm is held to under 5%-vol., especially under 3%-vol.; and the number of $\beta\text{-Si}_3\text{N}_4$ particles having the long axis diameter exceeding 10 μm is held to under 3%-vol., especially under 1%-vol., then there will be almost no adverse effects on the strength due to such micro-cracks.

Further, the powdered compositions that are sintered to form sintered silicon nitride articles according to a fourth embodiment of the invention contain silicon nitride powder as a raw material, magnesium oxide powder and ytterbium oxide powder. Such articles are characterized by the silicon nitride sintered articles for tools or the like incorporating a total amount of the magnesium oxide plus the ytterbium oxide of 0.55 to 2.5%-vol. per 100%-vol. of the total composition, and by the silicon nitride sintered article having a porosity of 0.06%-vol. or under.

If the total of the magnesium oxide and ytterbium oxide exceeds 2.5%-vol., then the hardness, etc., will not decline at high temperatures. Further still, if the foregoing porosity exceeds 0.06%-vol., the fineness of the structure to cutting inserts for high speed cutting will decline, and the wear resistance and other properties will be adversely affected.

Also, according to the fifth embodiment of the invention, the powder compositions that are sintered to form the sintered silicon nitride articles of the invention contain silicon nitride powder as a main constituent, magnesium oxide powder, ytterbium oxide powder and aluminum oxide powder. Such articles made by sintering the compositions having the aluminum oxide are characterized by incorporating from 0.25 to 1.5%-vol. of the magnesium oxide and 0.3 to 1.2%-vol. of the ytterbium oxide. In such articles, the total of the magnesium oxide and the ytterbium oxide comprises 2.5%-vol. and 1.0%-vol. or less (excluding 0%-vol.) of the aluminum oxide, per 100%-vol. of the total ceramic composition. The relative density of the silicon nitride ceramic article is 99% or greater and the porosity thereof is 0.06%-vol..

It is important when mixing the raw materials that a method be used which will not intermix impurities when preparing the mixture of raw material powders, lest the wear resistance of the sintered articles decline. Accordingly, the preferred method is to use equipment made of silicon nitride materials for mixing. However, since fabricating mixing equipment of silicon nitride would be extremely costly, plastic or aluminum oxide materials may be used. When plastic is used, any intermixture of the resin in the starting material powders is sublimated during firing, thereby causing no problems due to residuals in the sintered articles.

However, when using aluminum oxide, some of it will remain as a solid solution in the intergranular phase although others dissolve to form a so called expanded beta phase silicon nitride phase in the sintered article. If the amount of this intermixture is small, not only does it leave the wear resistance unaffected due to the increased amount of intergranular phase, but it actually improves the resistance to nicking and the sintering properties of the composition. Thus, when aluminum oxide material is used, consideration should be given to its effects on the wear resistance of the ceramic article. When aluminum oxide is additionally added (normally in powder form), appropriate reductions can be made in the amount of the sintering aids such as magnesium oxide and ytterbium oxide, with keeping the same good or better properties in the sintered article as if it were mixed in the mixing equipment made of silicon nitride or plastic resin material.

In the fifth embodiment of the invention, the total amounts of magnesium oxide and ytterbium oxide have been reduced as in the second embodiment of the invention. The aluminum oxide is introduced from the mixing equipment made of alumina and further added as a sintering aid to the amount of up to a maximum 1.0%-vol.. If the total amount of aluminum oxide exceeds 1.0 %-vol., then it is unlikely to obtain sintered articles having the same level of properties that can be obtained using the silicon nitride or plastic mixing equipment, and the wear resistance declines markedly.

Further, in the sixth embodiment of the invention, the upper limit for the magnesium oxide has been lowered and the amount of aluminum oxide has been increased to 0.5 to 1.0%-vol.. As in the seventh embodiment of the invention, the preferred amount of aluminum oxide content is 0.7%-vol. or with 0.8%-vol. being especially preferred. This level of addition will produce the sintered articles having good wear resistance and excellent resistance to nicking.

In order to further enhance the wear resistance as in an eight embodiment of the invention, it is preferable to increase the sintering temperature, especially the primary firing temperature. The preferred temperature is 1700° C. or greater, preferably 1800° C. or greater. When sintered at this temperature, tightly packed or high density sintered silicon nitride articles are obtained, which exhibit excellent wear resistance in high speed cutting (high temperature).

While the primary objective of the present invention is to improve wear resistance, nevertheless, it is also possible to produce sintered articles that have excellent resistance to nicking. For example, when aluminum oxide is included, and the content of magnesium oxide is in the range of 1.5 to 3.0%-vol., and the content of ytterbium oxide is in the range of 1.0 to 3.0%-vol., it is possible to obtain excellent resistance to nicking as evidenced by the capability of passing 86 or more threads in the cutting test of fracture-resistance as explained later. Further, with contents of 0.25%-vol. of magnesium oxide, 1.0 to 1.3%-vol. of ytterbium oxide, and 0.8 to 1.2%-vol. of aluminum oxide, it is possible to obtain sintered articles with excellent resistance to nicking as evidenced by the capability of passing 68 threads in the same cutting test.

A ninth embodiment of the invention contemplates a method for preparing sintered silicon nitride articles from a powder composition which essentially consists of silicon nitride powder, magnesium oxide powder and ytterbium oxide powder. Such methods are characterized by the preparation of the raw silicon nitride powder composition that essentially consists of 0.25 to 3.0%-vol. of magnesium oxide powder and 0.3 to 2.0%-vol. of the ytterbium oxide powder and the rest % of alpha silicon nitride powder, and wherein the total of the magnesium oxide powder plus the ytterbium oxide powder is 4.0%-vol. or less per 100%-vol. of the powder composition. The pressed and formed unfired ceramic composition then undergo a primary firing in a nitrogen environment at a temperature of from 1700 to 1900° C., and a pressure of 0.3 to 1.0 MPa, followed by a secondary firing in a nitrogen environment at 1500 to 1700° C. and a pressure of 100 to 200 MPa.

Also, according to a tenth embodiment of the invention, the composition may contain up to 1.0%-vol. of aluminum oxide (excluding 0%-vol. content). If the amount of aluminum oxide that is introduced from the mixing equipment plus any directly added exceeds 1.0%., then the wear resistance of the resulting sintered articles decline. Therefore, it is desirable for the aluminum oxide powder content to be 0.5%-vol., or greater but not to exceed 1.0% when added with magnesium oxide and ytterbium oxide because in that case the sintered articles exhibit excellent wear resistance and nicking resistance.

If the above specified primary firing temperature is under 1700° C., the sintering will not proceed adequately, and the tightness of packing will decline, causing the wear resistance of the sintered articles to decline as well. If the firing temperature exceeds 1900° C., too large particles will be grown to the point where resultant ceramic performance will be undesirable. Further, if the primary firing pressure is less than 0.3 MPa, then decomposition of the silicon nitride will not be adequately inhibited. It has been found and recognized that 1.0 MPa of pressure is adequate, but, the use of higher pressures would require costly equipment.

Further, during the specific second firing process, if the temperature is under 1500° C., the sintering will not proceed adequately; if it exceeds 1700° C., then it would be higher than the first stage firing temperature, and the second stage firing would be the dominating factor in the particle diameter. This is not advantageous with regard to the properties of the sintered articles for cutting inserts. Further, if the secondary firing or sintering pressure is under 100 MPa, the pores in the sintering ceramic will not be wetted, and tight packing will not be achieved. If the pressure is very high and exceeds 200 MPa, it will not change the properties of the resulting sintered articles, and expensive equipment would be required.

By using a small amount of sintering aids according to the method of this invention, it is possible to lower the porosity of the sintered articles; in other words, by using a HIP method in the secondary firing process at a lower temperature than in the primary firing process, it is possible to produce tighter packing. During the primary firing, the article is sintered to the extent that any abnormal growth of beta silicon nitride particles develop. In the secondary firing, the HIP method is used at the temperature lower than that of the primary firing. By so doing, excessive particle growth is prevented, thereby promoting the development of tightly packed sintered silicon nitride articles for tools that exhibit both excellent wear resistance and nicking.

It is preferable that the firing temperature used in the secondary sintering be lower than that used in the primary. For example, if the primary firing is implemented near the upper limit of the range at 1850–1900° C., then the secondary firing temperature should be around 1650° C., or about 200 to 250° lower than the first stage. If the first stage firing pressure ranges from 0.3 to 0.5 MPa, the second stage firing pressure is 100 to 150 MPa. If such relation of temperatures with pressures is used in the primary and secondary sintering processes, the resultant sintered articles show excellent wear resistance, especially at high temperatures.

Examples of the present invention and their characteristics will now be discussed with reference to Tables 1–4.

The silicon nitride powder that was used as a starting material in this embodiment of the invention had an average particle diameter of 0.5 µm and was composed of 95% or more of α-type silicon nitride with an oxygen content of about 1.5% by weight. As sintering aids, magnesium oxide powder with an average particle diameter of 0.3–0.4 µm and ytterbium oxide powder with an average particle diameter ranging from 0.5 to 1.5 µm were used.

The foregoing powders were prepared to make the compositions shown in Tables 1, 2, 3 and 4, and they were milled and mixed either in plastic mixing equipment using spherical plastic balls, or in an alumina mixing equipment using alumina balls for 16 hours, using ethanol as a mixing solvent. After that, an organic binder was added and a die was used to press the compositions into the ISO standard shapes of SNGN120408 tools. The shaped articles were then degassed, and sintered at the temperature and pressure conditions indicated in the Tables 1–4 to obtain the silicon nitride sintered articles.

The analytical values shown in Table 3 for aluminum oxide were obtained by using fluorescent X ray analysis for the aluminum content in the composition that resulted from mixing with the aluminum oxide balls in the alumina mixing equipment. This value is indicated as a percent by weight based on the 100% by weight of the total composition of the magnesium oxide, ytterbium oxide and silicon nitride in the composition. Further, in Tables 1, 3 and 4, the * indicates outside of the scope of the first or the ninth embodiments of the invention.

The Archimedes method was used to measure the relative density of the sintered articles from the various examples, and with the exception of example number 23, it was found to be 99% or greater. This relative density is the percentage of the measured density with respect to the theoretical density computed for the starting composition components. Further, the porosity was measured according to CIS006B with the result that it was 0.06%-vol. or less except for Example number 23, thereby indicating that the articles had sufficient tight packing. CIS006B is the standard of micropores, and the equivalent of IS04505 (International Standardization Organization). Furthermore, the proportion of β-$Si_3N_4$ particles that had long axis diameters of 10 µm or greater that is indicated in Tables 3 and 4 was determined by SEM (Scanning Electron Microscope) using a magnification of 1000 times, and computing in 5 fields of view.

Cutting Test

Each of the fired ceramic blanks were shaped and polished into an indexable insert of ISO SNGN120408. The cutting test was conducted on each sample insert which was held with a holder of ISO CSBR2525N129.

(1) Wear Resistance of Flank Face.

The metallic workpiece having a ring-shape as shown in FIG. 1 was used to be cut as shown in FIG. 3 by each of the samples of the cutting insert, where L1 was 260 mm and L2 was 300 mm.

Black surface of the workpiece with cast sands thereon was cut by each sample insert for dry 10 ten seconds. Measurements were made of the maximum amount of wear that took place from one cutting pass, namely from the time the cutter was set into the black skin left from the casting sand of the piece of work being cut until it was removed from that workpiece. The results are listed in Tables 1 through 4.

The cutting conditions were as follows:
Workpiece : FC200
Speed: 300 m/minute
Feed: 0.34 mm/rev.
Depth: 1.5 mm
Cutting Edge: 0.15×20° chamfer type honing (2) Fracture Resistance of Cutting Edge The fracture resistance (nicking resistance) of the cutting edge of each sample insert was evaluated by cutting against the cylindrical workpiece having the threads as shown in FIG. 2, wherein L4 was 10 mm, L5 was 5 mm, L6 was 50 mm, L7 was 200 mm and D was 320 mm, under the conditions:

The cutting was stopped when the cutting edge was nicked or fractured. The number of the threads passed until the fracture of the edge was counted.
Work Material: FC200
Speed: 150 m/min.
Feed: 0.8 mm/rev.
Depth: 2.0 mm
Cutting Edge: 0.15×20° chamfer type honing The bigger number of passes by the insert over the threads indicates the higher fracture toughness of the ceramic insert.

(3) The Coating

For reference, 6 pieces of the ceramic inserts were coated with coating materials under the known CVD method in such order and thickness as shown in Table 5. Wear resistance tests were conducted and the test results are shown in the same table. Such coated sample inserts showed improvement in wear resistance when tested under the following conditions:
Work Material: FC200
Speed: 100 m/minute
Feed: 0.1 mm/rev.
Depth: 1.0 mm
Cutting Edge: 0.20×20° chamfer type honing
Cutting Time: 20 minutes In one preferred embodiment of the invention, a refractory coating includes at least two layers wherein a first or intermediate coating is composed of Al2O3, ALON, TiN, TiC or TiCN and an outermost layer of TiN.

The values shown in Tables 1–4 are as follows:
A=Example number
B=Composition (top=%-vol., bottom=weight %)
C=Amounts in compositions
D=Total amount
E=Firing conditions
F=Primary
G=Secondary
H=Firing temperature (° C.)
I=Pressure (MPa)
J=Cutting Tests
K=Wear on flank face of insert (mm)
L=Nicking resistance (fracture resistance), number of passed threads The results from the Tables 1 and 2 indicate a clear difference for the number of passed threads by each cutting insert. Example 1 and Example 2 indicate that when the ytterbium oxide is below the lower limit, the resistance to nicking will deteriorate. Further, when the amount of ytterbium oxide exceeds the upper limit of the second embodiment of the invention, as shown in Example 4, the wear resistance, compared with Example 3, is clearly inferior. On the other hand, in Example 6 where the amount of magnesium oxide is below the lower limit, the relative density was low at 98.3%, and not only was the packing tightness of the sintered articles inadequate, but the wear resistance and nicking resistance were greatly decreased from the levels exhibited by Example 3, which had a similar composition. Further, when comparing Examples 8 and 9, it is apparent that when the content of magnesium oxide exceeds the upper limit of the second embodiment of the invention, wear resistance declines substantially. While the total content of sintering adjuncts is near the upper limit for both Examples 11 and 12, when the proportion of the magnesium oxide is too high, the wear resistance declines considerably.

In Examples 13 through 17 shown in Table 3, the amounts of magnesium oxide and ytterbium oxide were kept constant and the content of aluminum oxide was varied between 0.46 and 1.11%-vol., in Examples 14 through 16. The sintered articles exhibited a good balance between wear resistance and resistance to nicking. On the other hand, when the content of aluminum oxide fell below the lower limit of the sixth embodiment of the invention in Example 13, there was a significant reduction in the resistance to nicking, and when it exceeded the upper limit as in Example 17, wear resistance declined.

Furthermore, even when the amounts of aluminum oxide and ytterbium oxide are at appropriate levels, if the amount of magnesium oxide is below the lower limit as in Example 18, the relative density is low, at 98.4%, and compared to Example 15, which had a similar composition, both the wear and nicking resistance fell dramatically. Further, when the content of the magnesium oxide exceeds the upper limit of the sixth embodiment of the invention as in Example 19, there is a significant decrease in the wear resistance. If, on the other hand, the aluminum oxide and magnesium oxide are included in appropriate amounts and the ytterbium oxide is under the lower limit as in Example 20, there is a considerable decline in the resistance to nicking, and if the ytterbium oxide exceeds the upper limit value for the sixth embodiment of the invention as in Example 21, the wear resistance declines considerably.

The results in Table 4 indicate that when the total amount of sintering adjuncts exceeds the upper limit as in Example 22, the wear resistance becomes very poor. Further, in Example 23, the primary sintering temperature was too low, and caused inadequate packing tightness as evidenced by the relative density of 98.3% and the porosity of 0.6%-vol.. Further, in Examples 24 and 25, yttrium oxide and dysprosium oxide were used, respectively, as the rare earth element oxides, but using the same amounts as the ytterbium oxide of Example 10. These examples produced vastly inferior wear resistance. Further, when the sintering temperature was too high as in Example 27, there was abnormal growth of $\beta$-$Si_3N_4$, and its nicking resistance was inferior to that of Example 26 which had an identical composition.

The results for Examples 11 and 12 in Table 2 and Example 22 from Table 4 indicate the flank wear of 1.48 to 1.88, which is less than adequate wear resistance. However, with 69 to 82 threads passed in the fracture resistance test, the sintered articles exhibited exceptional resistance to nicking. Further, in Examples 15–17 and in 19 and 21, the wear resistance decreased, but there were 68 to 78 passes in the fracture resistance test thereby showing a similar exceptionally high resistance to nicking by the sintered articles.

According to the first embodiment of the invention, by using small amounts of the specific sintering aids, the present sintered articles exhibit high packing (i.e. high density and low porosity) and excellent wear resistance at high temperatures (high speed cutting), making them very well suited as sintered silicon nitride tools. Further, by obtaining specific proportions of $\beta$-$Si_3N_4$ particles and by controlling the size of $\beta$-$Si_3N_4$ particles in the sintered articles as specified by the third embodiment of the invention, it is possible to obtain sintered silicon nitride articles for cutting tools or inserts that have excellent properties in especially the speed cutting performance which requires extremely high wear resistance and high fracture toughness.

Furthermore, when aluminum oxide equipment is used in the mixing of the raw material powders, aluminum oxide becomes intermixed into the materials. Aluminum oxide added in this manner, or, by adding it as a sintering aid, produced desirable qualities in the composition. For example, it is possible, with additional adjustments to the other sintering adjuncts, to produce sintered silicon nitride articles for tools that exhibit further improved packing tightness and wear resistance. In particular, if the proportion of aluminum oxide is increased to the level specified in the sixth embodiment of the invention, sintered articles can be produced which exhibit excellent wear resistance and vastly improved resistance to nicking.

Further still, it is possible to produce sintered silicon nitride articles which exhibit packing tightness, and wear resistance, especially at high temperatures, that exceed even those properties obtained from the other foregoing embodiments. If for example, as specified in the ninth embodiment of the invention, small quantities of specific sintering aids are employed, and a relatively high primary sintering temperature and low pressure are used, followed by sintering at lower temperature and a pressure of 100 MPa or higher, using the HIP method in the secondary sintering process, optimal properties can be obtained.

Figure 4:
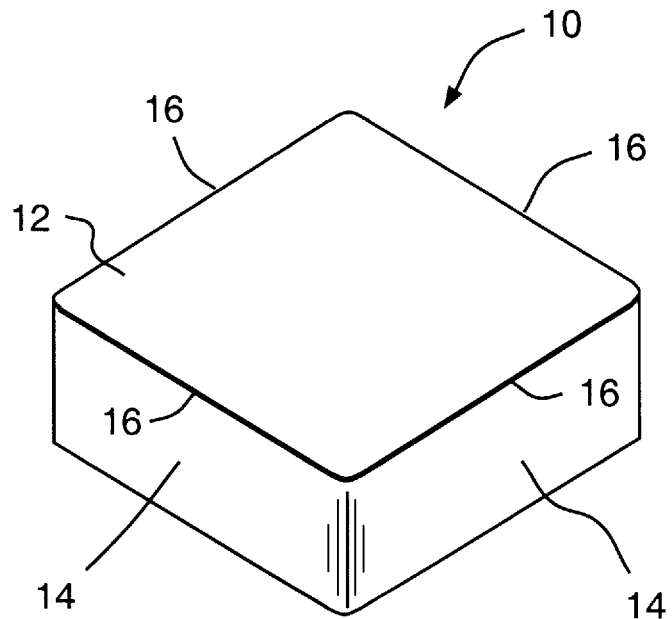
FIG. 4 is a perspective view of a cutting tool in accordance with one embodiment of the invention.

As shown in FIG. 4, a sintered silicon nitride cutting tool or insert 10 has a rake surface 12 and flank faces 14. The rake surface 12 allows metal chips to flow thereover and forms a cutting edge 16 with flank faces 14. This cutting edge may be sharp, honed or chamfered depending on the application as will be well understood by those skilled in the art. As a general rule, the cutting tool or insert 10 will be made in standard shapes and sizes as for example SNGN-434T, etc.

The positioning of the insert 10 and tool holder 11 are shown in FIG. 2. As shown therein, the insert is positioned for fracture resistance testing. The insert 10 and tool holder 11 are also shown in FIG. 3 wherein they are positioned for wear resistance testing.

Table 5 illustrates the analytical data on an elemental basis as opposed to an oxide basis. This data is included since it is difficult to determine MgO, $Yb_2O_3$ and $Al_2O_3$ in the fired ceramic. It is believed that most of the oxides of the starting materials are maintained until the beta silicon nitride is obtained by sintering. However, it is also believed that about one-half of the aluminum will be dissolved into the beta silicon nitride crystals and some of the oxygen lost.

The elements shown in table 5 were detected from each sample ceramic by an X-ray Fluorescence Spectrometer. The cross-sectioned surface of each ceramic sample was examined by a scanning electron microscope (SEM). The SEM was used to confirm that the beta phase silicon nitride grains and the intergranular phase were developed in the ceramic to the extent that the beta silicon nitride grains having long axis-diameters of more than 10 μm existed in no more that 4 volume percent of the ceramic. If the majority of the grains are grown more than 10 μm in long axis diameter, such beta phase silicon nitride ceramic are not suitable for cutting tools for metal cutting because of fracture.

In addition to the relative density in the original application, the porosity is added in order to indicate a higher density ceramic. For example, the porosity of the sintered silicon nitride ceramic was measured according to CISOOB. The porosity of each sample was less than 0.06 volume percent, except for sample Nos. 6, 18 and 23.

A porosity of less than 0.06 is an important factor for wear resistance and fracture, according to the invention.

TABLE 1

|   |   | B | | | | E | | | | | |
|---|---|---|---|---|---|---|---|---|---|---|---|
|   |   | C | | | | F | | G | | J | |
| A |   | MgO | Yb$_2$O$_3$ | D | Si$_3$N$_4$ | H | I | H | I | K | L |
| 1 |   | 0.27 | 0.28 | 0.55 | 99.45 | 1900 | 0.3 | 1650 | 100 | 0.71 | 30 |
|   |   | 0.30 | 0.80 | 1.10 | 98.90 |   |   |   |   |   |   |
| 2 |   | 0.27 | 0.35 | 0.62 | 99.38 |   |   |   |   | 0.76 | 43 |
|   |   | 0.30 | 1.00 | 1.30 | 98.70 |   |   |   |   |   |   |
| 3 |   | 0.27 | 1.15 | 1.42 | 98.58 |   |   |   |   | 0.96 | 48 |
|   |   | 0.30 | 3.23 | 3.53 | 96.47 |   |   |   |   |   |   |
| 4 |   | 0.27 | 1.28 | 1.55 | 98.45 |   |   |   |   | 1.14 | 54 |
|   |   | 0.30 | 3.58 | 3.88 | 96.12 |   |   |   |   |   |   |
| 5 |   | 0.27 | 1.80 | 2.07 | 97.93 |   |   |   |   | 1.37 | 63 |
|   |   | 0.30 | 5.00 | 5.30 | 94.70 |   |   |   |   |   |   |
| 6 |   | *0.23 | 1.15 | 1.38 | 98.62 |   |   |   |   | 1.59 | 34 |
|   |   | 0.26 | 3.23 | 3.49 | 96.51 |   |   |   |   |   |   |

TABLE 2

|   |   | B | | | | E | | | | | |
|---|---|---|---|---|---|---|---|---|---|---|---|
|   |   | C | | | | F | | G | | J | |
| A |   | MgO | Yb$_2$O$_3$ | D | Si$_3$N$_4$ | H | I | H | I | K | L |
| 7 |   | 0.88 | 0.30 | 1.18 | 98.82 | 1900 | 0.3 | 1650 | 100 | 0.97 | 49 |
|   |   | 1.00 | 0.85 | 1.85 | 98.15 |   |   |   |   |   |   |
| 8 |   | 1.46 | 0.33 | 1.79 | 98.21 |   |   |   |   | 1.22 | 54 |
|   |   | 1.65 | 0.94 | 2.59 | 97.41 |   |   |   |   |   |   |
| 9 |   | 1.55 | 0.33 | 1.88 | 98.12 |   |   |   |   | 1.44 | 59 |
|   |   | 1.75 | 0.94 | 2.69 | 97.31 |   |   |   |   |   |   |
| 10 |  | 0.88 | 0.66 | 1.54 | 98.46 |   |   |   |   | 1.06 | 61 |
|   |   | 1.00 | 1.87 | 2.87 | 97.13 |   |   |   |   |   |   |
| 11 |  | 2.79 | 1.07 | 3.86 | 96.14 |   |   |   |   | 1.65 | 69 |
|   |   | 3.11 | 3.00 | 6.11 | 93.89 |   |   |   |   |   |   |
| 12 |  | 1.83 | 2.00 | 3.83 | 96.17 |   |   |   |   | 1.48 | 74 |
|   |   | 2.00 | 5.50 | 7.50 | 92.50 |   |   |   |   |   |   |

TABLE 3

|   |   | B | | | | | E | | | | | | |
|---|---|---|---|---|---|---|---|---|---|---|---|---|---|
|   |   | C | | | | M | F | | G | | | J | |
| A |   | MgO | Yb$_2$O$_3$ | D | Si$_3$N$_4$ | Al$_2$O$_3$ | H | I | H | I | N | K | L |
| 13 |  | 0.27 | 1.07 | 1.34 | 98.66 | 0.46 | 1900 | 0.3 | 1650 | 100 | 2.7 | 1.29 | 50 |
|   |   | 0.30 | 3.00 | 3.30 | 96.70 | 0.56 |   |   |   |   |   |   |   |
| 14 |  |   |   |   |   | 0.52 |   |   |   |   | 2.7 | 1.32 | 61 |
|   |   |   |   |   |   | 0.63 |   |   |   |   |   |   |   |
| 15 |  |   |   |   |   | 0.84 |   |   |   |   | 2.9 | 1.35 | 69 |
|   |   |   |   |   |   | 1.02 |   |   |   |   |   |   |   |
| 16 |  |   |   |   |   | 1.00 |   |   |   |   | 2.9 | 1.41 | 76 |
|   |   |   |   |   |   | 1.21 |   |   |   |   |   |   |   |

TABLE 3-continued

| | B | | | | E | | | | | | |
|---|---|---|---|---|---|---|---|---|---|---|---|
| | C | | | | M | F | | G | | J | |
| | MgO | Yb₂O₃ | D | Si₃N₄ | Al₂O₃ | H | I | H | I | N | K | L |
| 17 | | | | | 1.11 | | | | | 3.2 | 1.59 | 78 |
| | | | | | 1.34 | | | | | | | |
| 18 | *0.23 | 1.07 | 1.30 | 98.70 | 0.84 | | | | | 2.6 | 1.76 | 46 |
| | 0.25 | 3.00 | 3.25 | 96.75 | 1.02 | | | | | | | |
| 19 | 1.56 | 1.07 | 2.15 | 97.85 | 0.86 | | | | | 3.4 | 1.64 | 68 |
| | 1.71 | 3.00 | 4.71 | 95.29 | 1.05 | | | | | | | |
| 20 | 0.27 | 0.26 | 0.59 | 99.47 | 0.84 | | | | | 1.9 | 0.68 | 26 |
| | 0.30 | 0.73 | 7.50 | 98.97 | 1.02 | | | | | | | |
| 21 | 0.27 | 1.26 | 1.53 | 98.47 | 0.84 | | | | | 3.1 | 1.74 | 74 |
| | 0.30 | 3.50 | 3.60 | 96.20 | 1.02 | | | | | | | |

M: Analysis Value
N: β-Si₃N₄ Particles Having Long Axis Diameter of 10 μm or more (Area %)

TABLE 4

| | B | | | | E | | | | J | | |
|---|---|---|---|---|---|---|---|---|---|---|---|
| | C | | | | F | | G | | | | |
| | MgO | Yb₂O₃ | D | Si₃N₄ | H | I | H | I | N | K | L |
| A | | | | | | | | | | | |
| 22 | 2.79 | 2.96 | *5.75 | 94.25 | 1800 | 0.3 | 1600 | 100 | 2.6 | 1.88 | 82 |
| | 3.00 | 8.00 | 11.0 | 89.00 | | | | | | | |
| 23 | 0.27 | 1.07 | 1.34 | 98.66 | *1650 | | | | 1.4 | 1.74 | 34 |
| 24 | 0.88 | *Y₂O₃ | 1.54 | 98.46 | 1900 | | | | 2.8 | 1.53 | 61 |
| | 1.00 | 0.66 | 2.00 | 98.0 | | | | | | | |
| | | 1.00 | | | | | | | | | |
| 25 | 0.89 | *Dy₂O₃ | 1.68 | 98.32 | | | | | 3.1 | 1.55 | 63 |
| | 1.00 | 0.79 | 3.00 | 97.0 | | | | | | | |
| | | 2.00 | | | | | | | | | |
| 26 | 0.27 | 1.07 | 1.34 | 98.66 | | | | | 2.4 | 1.27 | 46 |
| | 0.30 | 3.00 | 3.30 | 96.70 | | | | | | | |
| 27 | | | | | *1950 | | | | 4.3 | 1.24 | 28 |

N: β-Si₃N₄ Particles Having Long Axis Diameter of 10 μm or more (Area %)

TABLE 5

| | Analysis Value of Sintered ceramic | | | | | J | |
|---|---|---|---|---|---|---|---|
| | Mg | Yb | Al | O | N | K | L |
| A | | | | | | | |
| 1 | 0.18 | 0.80 | | 0.82 | 1.6 | 0.71 | 30 |
| 2 | 0.19 | 0.82 | | 0.84 | 1.9 | 0.76 | 43 |
| 3 | 0.17 | 2.93 | | 0.89 | 2.2 | 0.96 | 48 |
| 4 | 0.17 | 3.24 | | 1.01 | 2.1 | 1.14 | 54 |
| 5 | 0.20 | 4.45 | | 1.11 | 2.6 | 1.37 | 83 |
| 6 | 0.14 | 2.90 | | 0.98 | 2.5 | 1.69 | 34 |
| 7 | 0.57 | 0.80 | | 0.98 | 1.7 | 0.97 | 49 |
| 8 | 0.98 | 0.87 | | 1.14 | 1.9 | 1.22 | 54 |
| 9 | 1.08 | 0.90 | | 1.17 | 1.8 | 1.44 | 59 |
| 10 | 0.62 | 1.76 | | 1.07 | 1.7 | 1.06 | 81 |
| 11 | 1.90 | 2.70 | | 1.81 | 3.3 | 1.85 | 69 |
| 12 | 1.18 | 4.79 | | 1.61 | 3.6 | 1.48 | 74 |
| 13 | 0.21 | 2.80 | 0.31 | 1.15 | 2.7 | 1.29 | 50 |
| 14 | 0.19 | 2.76 | 0.35 | 1.16 | 2.7 | 1.32 | 61 |
| 15 | 0.21 | 2.68 | 0.62 | 1.24 | 2.9 | 1.35 | 69 |
| 16 | 0.19 | 2.77 | 0.63 | 1.30 | 2.9 | 1.41 | 76 |
| 17 | 0.21 | 2.70 | 0.69 | 1.33 | 3.2 | 1.59 | 78 |
| 18 | 0.14 | 2.61 | 0.67 | 1.24 | 2.6 | 1.76 | 48 |
| 19 | 1.08 | 2.58 | 0.68 | 1.59 | 3.4 | 1.64 | 68 |
| 20 | 0.19 | 0.72 | 0.55 | 1.11 | 1.8 | 0.88 | 26 |
| 21 | 0.19 | 3.11 | 0.53 | 1.27 | 3.1 | 1.74 | 74 |
| 22 | 1.82 | 7.14 | | 1.94 | 2.6 | 1.88 | 82 |
| 23 | 0.19 | 2.71 | | 0.96 | 1.4 | 1.74 | 34 |
| 24 | 0.59 | Y 0.80 | | 1.04 | 2.8 | 1.53 | 61 |
| 25 | 0.58 | DY 1.68 | | 1.05 | 3.1 | 1.55 | 63 |
| 26 | 0.18 | 2.68 | | 0.97 | 2.4 | 1.27 | 46 |
| 27 | 0.18 | 2.49 | | 0.98 | 4.3 | 1.24 | 28 |

A: Example number
N: β-Si₃N₄ particles having long axle diameter of 10 μm or more (%)
J: Cutting tests
K: Wear on flank face of insert (mm)
L: Nicking resistance (fracture resistance), number of passed threads

TABLE 6

| Coating Material and Thickness of Coating Layer (μm) (from Left to Right: ceramic side to outermost) | Total Thickness (μm) | Wear of Flank Face (mm) |
|---|---|---|
| A | | |
| 15 | — | 0.62 |
| 28 AlON + TiCN + TiN (0.6) (0.5) (0.2) | 1.3 | 0.49 |
| 29 TiC + TiCN + AlON + TiCN + TiN (0.3) (0.4) (0.5) (0.4) (0.2) | 1.8 | 0.31 |
| 30 AlON + TiC + TiCN + AlON + TiCN + TiN (0.2) (0.6) (0.7) (0.6) (0.8) (0.4) | 3.3 | 0.28 |
| 31 TiN + AlON + TiCN + AlON + TiCN + TIN (0.3) (0.8) (0.9) (0.8) (0.9) (0.4) | 4.1 | 0.24 |
| 32 AlON + TiC + Al$_2$O$_3$ + TiN + Al$_2$O$_3$ + TiCN + TiN (0.4) (0.8) (1.2) (0.8) (0.9) (1.1) (0.4) | 5.6 | 0.18 |
| 33 AlON + TiC + Al$_2$O$_3$ + TiN + Al$_2$O$_3$ + TiCN + TiN (0.5) (1.2) (1.1) (0.9) (1.0) (1.2) (0.4) | 6.3 | 0.47 |

While the invention has been described in connection with its preferred embodiments, it should be recognized that changes and modifications may be made without departing from the scope of the claims.

What is claimed is:

1. A ceramic cutting tool for high speed chip forming machining of metallic materials, said ceramic cutting tool comprising:
   a rake face over which chips formed during said chip forming machining of metallic materials will flow;
   a flank face;
   a cutting edge, for cutting into said metallic materials at high speeds to form said chips, formed at a junction of said rake face and said flank face;
   said ceramic cutting tool consisting essentially of beta silicon nitride and an intergranular phase; and
   wherein the beta silicon nitride has crystalline grains, wherein less than 4% of the grains are more than 10 μm in a long axis diameter when measured on the cross sectioned surface of the ceramic by an electron micrograph; and
   wherein said ceramic cutting tool has 0.15 to 2.0 weight percent of magnesium, 0.7–5 weight percent of ytterbium, and 0.8–1.7 weight percent of oxygen on an elemental basis, and wherein the porosity of said cutting tool is less than 0.06 volume percent.

2. A ceramic cutting tool according to claim 1 further comprising a refractory coating on said ceramic cutting tool.

3. A ceramic cutting tool according to claim 2, wherein said refractory coating has at least two layers, wherein an intermediate coating material includes Al2O3, ALON, TiN, TiC, and TiCN, and wherein an outermost coating material includes TiN.

4. A ceramic cutting tool for high speed chip forming machining of metallic materials, said ceramic cutting tool comprising:
   a rake face over which chips formed during said chip forming machining of metallic materials will flow;
   a flank face;
   a cutting edge, for cutting into said metallic materials at high speeds to form said chips, formed at a junction of said rake face and said flank face;
   said ceramic cutting tool consisting essentially of beta silicon nitride and an intergranular phase; and
   wherein said ceramic cutting tool has 0.15 to 2.0 weight percent of magnesium, 0.7–5 weight percent of ytterbium, and 0.8–1.7 weight percent of oxygen on an elemental basis, and wherein the porosity of said cutting tool is less than 0.06 volume percent; and,
   wherein said magnesium is magnesium oxide, and said ytterbium is ytterbium oxide, and wherein the sum of the magnesium oxide and the ytterbium oxide is less than 4 volume percent.

5. A ceramic cutting tool according to claim 1, wherein the magnesium is 0.3–0.8 weight percent and the ytterbium is 1.0–2.5 weight percent.

6. A ceramic cutting tool for high speed chip forming machining of metallic materials, said ceramic cutting tool comprising:
   a rake face over which chips formed during said chip forming machining of metallic materials will flow;
   a flank face;
   a cutting edge, for cutting into said metallic materials at high speeds to form said chips, formed at a junction of said rake face and said flank face;
   said ceramic cutting tool consisting essentially of beta silicon nitride and an intergranular phase; and
   wherein said ceramic cutting tool has 0.15 to 2.0 weight percent of magnesium, 0.7–5 weight percent of ytterbium, and 0.8–1.7 weight percent of oxygen on an elemental basis, and wherein the porosity of said cutting tool is less than 0.06 volume percent; and,
   wherein said ceramic cutting tool has 0.2–0.8 weight percent of aluminum.

7. A ceramic cutting tool according to claim 6, wherein said aluminum is between 0.3 and 0.7 weight percent.

8. A ceramic cutting tool according to claim 4, wherein said ceramic cutting tool has a relative density of at least 99 percent.

9. A ceramic cutting tool consisting essentially of beta silicon nitride and an intergranular phase; wherein said ceramic cutting tool has 0.15–2.0 weight percent of magnesium, 0.7–5 weight percent of ytterbium. 0.8–1.7 weight percent of oxygen on an elemental basis; and,
   wherein said ceramic cutting tool includes 0.2–0.8 weight percent of aluminum and wherein the porosity of said ceramic cutting tool is less than 0.06 volume percent.

10. A ceramic cutting tool according to claim 9, wherein said magnesium is in a form of magnesium oxide, and said ytterbium is in a form of ytterbium oxide, and wherein the sum of the magnesium oxide and the ytterbium oxide is less than 4 volume percent.

11. A ceramic cutting tool according to claim 9, wherein said aluminum is in an amount of from 0.3 to 0.65 weight percent.

* * * * *